April 1, 1930. G. H. WHITTINGHAM 1,753,101
EMERGENCY ELECTRIC LIGHTING SYSTEM
Filed Feb. 20, 1928
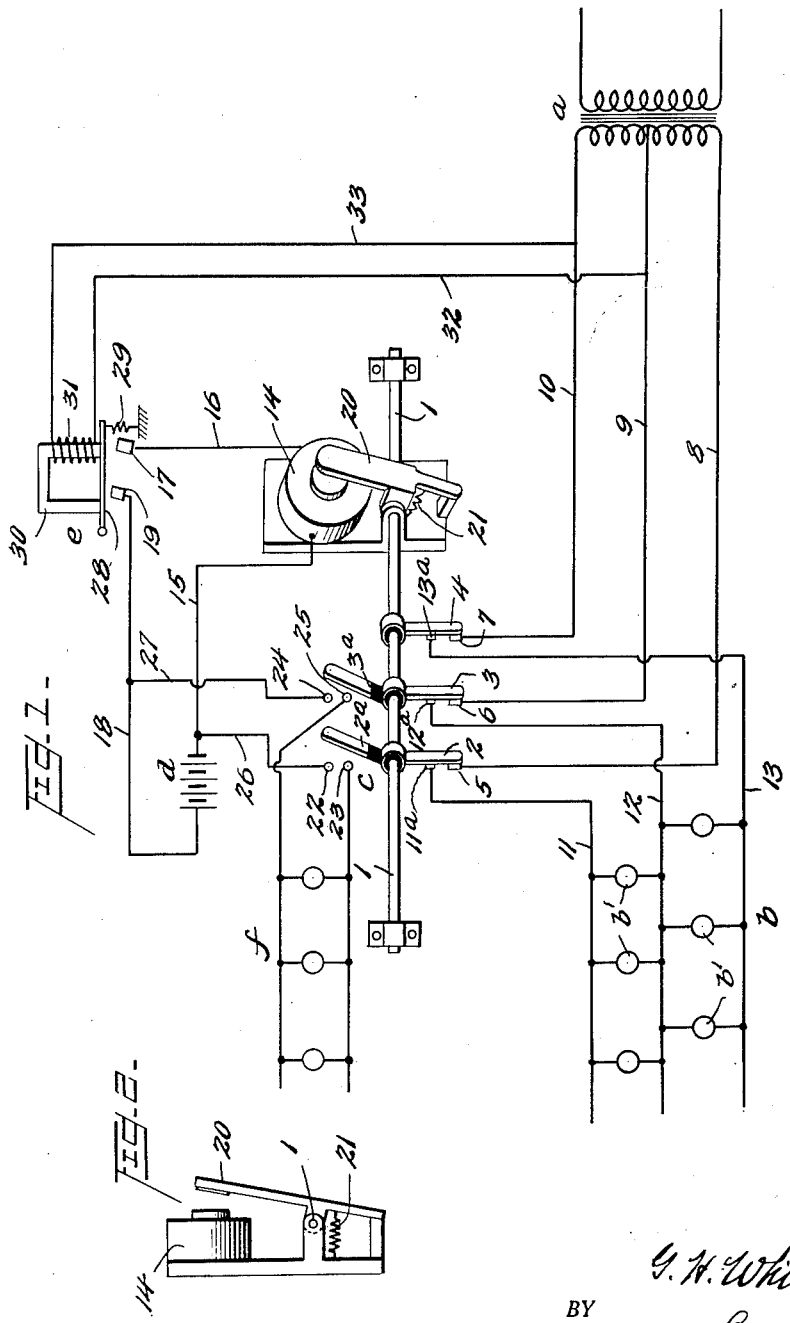
INVENTOR.
G. H. Whittingham
BY
Robert Watson
ATTORNEY.

Patented Apr. 1, 1930

1,753,101

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

EMERGENCY ELECTRIC-LIGHTING SYSTEM

Application filed February 20, 1928. Serial No. 255,776.

This invention relates to emergency electric lighting systems, and particularly to means for automatically disconnecting a main lighting system in a building from the public service power line, in case of failure of current in the latter, and for connecting an auxiliary lighting system to an auxiliary current source until the proper current conditions are restored in the power line, when the connections between the auxiliary system and source will be automatically cut off and the connections between the main system and the power line will be re-established.

Electrically lighted halls, theatres, and other places of public assemblage are usually provided with a three-wire system of distribution, and in most places this is connected to an alternating current power line. It is now common practice to provide a battery as an auxiliary source of current, and a switch for connecting an auxiliary house wiring system to the battery in case of failure of current in the power line. In accordance with the present invention, I provide a double-throw switch having three switch arms which normally connect the service wires of an alternating current system with the main house wiring system, and a magnet, adapted to be energized by current from the battery, for moving said switch to disconnect the main system from the alternating current service wires and connect an auxiliary house wiring system to the battery. The circuit through the magnet is controlled by a relay switch having a coil connected to the alternating current service wires, and as long as the proper current conditions prevail in the alternating current system, the relay switch is held in open position; but if the alternating current fails, the relay switch closes the battery circuit through the magnet and the latter moves the switch to connect the auxiliary house wiring system with the battery. When the proper current conditions are restored in the alternating current system, the relay opens the circuit of the magnet, the latter becomes deenergized, and the switch moves back to normal position, reestablishing connection between the alternating current service wires and the main house wiring system. As the switch magnet is energized by direct current, it may be made as large as desirable without danger of overheating. The magnet of the relay, being small, will not be injured by constant use in the alternating current circuit.

In the accompanying drawing,

Fig. 1 is a diagrammatic view illustrating the invention; and,

Fig. 2 is a side elevation of the magnet and armature for rocking the switch to disconnect the main house wires from the alternating current source and connect the auxiliary wires to the battery.

Referring to the drawing, $a$ indicates an alternating current source, and $b$ indicates a three-wire house lighting system which is normally connected to said source through a double-throw switch $c$. This switch comprises a rock shaft 1, upon which switch arms 2, 3 and 4 are mounted, these arms being insulated from the shaft. The shaft also carries switch arms $2^a$ and $3^a$ which are insulated from the shaft and from the other arms. The arms 2, 3 and 4 normally engage contacts 5, 6 and 7 which form the terminals of the alternating service wires 8, 9 and 10, respectively, and they also engage contacts $11^a$, $12^a$ and $13^a$, which are connected to the main house wires 11, 12 and 13, respectively. When the switch arms 2, 3 and 4 engage these contacts, it will be seen that the service wires 8, 9 and 10 will be connected to the house wires 13, 12 and 11, respectively, and that the lamps $b'$ will be lighted by current from the alternating current source. This is the normal position of the switch.

A battery, for supplying current to lamps in an auxiliary house wiring system $f$, in case the alternating current from the power line fails, is indicated at $d$, and a magnet 14 has its coil connected to one terminal of the battery by conductor 15 and by a conductor 16 to one terminal 17 of a relay switch $e$. The other terminal of the battery is connected by conductor 18 to a terminal 19 of the relay switch. An armature 20, secured to the shaft 1, is arranged opposite the pole of the magnet 14, and when the magnet is energized, the armature is attracted and moved against the tension of a spring 21 so as to rock the switch arms 2, 3 and 4 away from their respective contacts, and to rock the arm 2ª into engagement with contacts 22 and 23 and the arm 3ª into engagement with contacts 24 and 25. The contact 22 is connected to one terminal of the battery by conductor 26, and the contact 24 is connected to the other terminal of the battery by conductors 27 and 18. The contacts 23 and 25 are, as shown, terminals of the two-wire auxiliary lighting system *f*. When the magnet 14 is energized, therefore, the arms 2ª and 3ª will connect the auxiliary system to the battery.

The relay switch comprises the stationary contacts 17 and 19 and a switch member 28 which is biased toward said contacts by a light spring 29, and it also comprises a magnet 30, having its coil 31 connected by wires 32 and 33 to the service wires 9 and 10, respectively of the alternating current system.

Normally, the lamps in the main house system are connected to the alternating current power source and the relay magnet 30 holds the switch member 28 out of engagement with the terminals 17 and 19. Therefore, while the alternating current system is working properly, the battery circuit will remain open at the relay switch and the magnet 14 will remain de-energized. In case the current from the alternating source fails, however, the relay magnet will be de-energized and the relay switch will close the battery circuit through the coil of magnet 14, and the latter will attract the armature 20 which will cause the switch *c* to disconnect the alternating current service wires from the main lighting system and connect the battery to the auxiliary system. Direct current will then flow from the battery through the latter system until the proper current conditions are restored in the alternating current service wires, when the relay magnet will be energized and the relay switch arm 28 will be attracted by said magnet and will open the circuit through the magnet 14. The magnet 14 will then become de-energized and the spring 21 will rock the shaft 1 back to its normal position, shown in the diagram. The switch *c* will then break the connections between the battery and the auxiliary system and re-establish the connections between the alternating current service wires and the main lighting system.

As the magnet 14 is operated from a direct current source, it may be made as large and powerful as desired, without danger of overheating. The relay magnet being quite small may be kept constantly energized by the alternating current, without danger of burning out.

What I claim is:

1. The combination with a main current source, an auxiliary current source and main and auxiliary house lighting systems, of a double-throw switch normally connecting said main system with the main current source, a magnet adapted, when energized, to move said switch to disconnect the main system from the main current source and connect the auxiliary system with the auxiliary current source, a circuit from the latter source including the coil of said magnet, and a relay controlled by current from the main current source adapted to close the circuit of the magnet when the main current fails and to open the magnet circuit when the current from the main current source is restored.

2. The combination with an alternating current source, a battery and main and auxiliary house lighting systems, of a double-throw switch normally connecting said main system with the alternating current source, a magnet adapted, when energized, to move said switch to disconnect the main system from the alternating current source and connect the auxiliary system with the battery, a circuit from the battery including the coil of said magnet, and a relay controlled by current from the alternating current source adapted to close the circuit of the magnet when the alternating current fails and to open the magnet circuit when the current from the alternating current source is restored.

In testimony whereof I hereunto affix my signature.

GEORGE H. WHITTINGHAM.